US006354463B1

(12) United States Patent
Pahl

(10) Patent No.: US 6,354,463 B1
(45) Date of Patent: Mar. 12, 2002

(54) DEVICE FOR DISPENSING A FLOWING MEDIUM IN A METERED MANNER

(75) Inventor: Andreas Pahl, Hilden (DE)

(73) Assignee: ITW Industrie GmbH, Mettmann (DE)

(*) Notice: Subject to any disclaimer, the term of this patent is extended or adjusted under 35 U.S.C. 154(b) by 0 days.

(21) Appl. No.: 09/617,085

(22) Filed: Jul. 14, 2000

(30) Foreign Application Priority Data

Jul. 23, 1999 (DE) ........................................ 199 34 641

(51) Int. Cl.[7] ................................................ G01C 11/00

(52) U.S. Cl. ......................... 222/1; 222/146.5; 222/567

(58) Field of Search ............................. 222/146.5, 567, 222/568, 1

(56) References Cited

U.S. PATENT DOCUMENTS 4,586,636 A * 5/1986 Bauer et al. ............ 222/146.5
5,056,687 A * 10/1991 Ciaassen .................. 222/146.5
5,720,417 A * 2/1998 Wurth et al. ............ 222/146.5

FOREIGN PATENT DOCUMENTS

DE 299 05 345 7/1999

* cited by examiner

*Primary Examiner*—Joseph A. Kaufman
(74) *Attorney, Agent, or Firm*—Lowe Hauptman Gilman & Berner, LLP

(57) ABSTRACT

A device for dispensing flowing media, in particular hot-melt adhesives, cold adhesive, lubricants, paints or the like, in a metered manner, comprises a deposition head having numerous flowing-media feed ducts opening to a boundary surface thereof, and at least one deposition module mounted on the boundary surface and comprising a nozzle head to deposit the flowing media in a particular pattern, such as spots, beads or the like, on a moving substrate. The device comprises at least two mounting pins projecting from the boundary surface and passing through and beyond boreholes of the deposition module. At least one clamping element acting, at least indirectly, on the deposition module is provided in end zones of the mounting pins which project from the deposition module. Affixation or exchange of the deposition module is thus significantly simplified by slipping the deposition module onto the mounting pins and fastening the clamping element.

20 Claims, 4 Drawing Sheets

DEVICE FOR DISPENSING A FLOWING MEDIUM IN A METERED MANNER

FIELD OF THE INVENTION

The invention relates to a device for dispensing a flowing medium in a metered manner, in particular a hot-melt adhesive, cold adhesive, lubricant, paint or the like.

BACKGROUND OF THE INVENTION

A conventional device comprises a deposition head having a boundary surface formed with numerous flow-medium feed ducts, and at least one deposition module mounted on the boundary surface and fitted with a noble head to deposit adhesive in spots, beads or the like on a substrate moving by.

In such a device, the deposition module is mounted by means of two sockethead screws on the deposition head feeding the deposition module.

However, this basically economical system incurs the drawback that when the deposition module, which is hot in order to prolong the service life of machine settings, is replaced, frequently the adhesive drips out of the adhesive ducts and flows into the threads of the sockethead screws. Since this adhesive will burn, it forms a hard crust which at the next replacement of the deposition module will degrade the operability of the thread and hamper assembly of the deposition module.

Furthermore, exact assembly of the deposition modules is especially difficult when the device is hot. The screws may easily be dropped into the device and lost, ie spare screws are needed.

Lastly, the threads maybe damaged so much that a new deposition module no longer can be affixed, and as a result, the entire deposition head must be removed from the machine and new sockethead screws must be inserted. This procedure causes significant shutdown in production.

SUMMARY OF THE INVENTION

It is the objective of the present invention to create a new device for dispensing flowing media which allows for significantly simpler affixation or exchange of the deposition module.

The invention solves this problem in that the boundary surface is fitted with at least two mounting pins passing through boreholes of the deposition module, and in that at least one clamping element acting at least indirectly on the deposition module is configured on the end zones of the mounting pins projecting from the deposition module.

The device of the invention offers a first substantial advantage in that the threads serving to affix the mounting pins in the deposition head need not be loosened during replacement of the deposition module and accordingly shall not be exposed to wear by conventional mounting procedures and furthermore cannot be damaged by leaking adhesive. Also, by merely slipping the deposition module on the mounting pins firmly against the deposition head, a reliable pre-assembly position can be attained, and subsequent actuation of the clamping element then assures non-shifting affixation.

Also, a support plate enclosing both end zones of the mounting pins can be mounted advantageously between the clamping element and the deposition module.

designed so that it shall be secured at the pre-assembly position in the untightened state, and in the tightened state, clamping of the sliding support plate shall be attained.

In an especially preferred embodiment of the invention, the clamping element consists of a compression screw mounted in a threaded hole of the sliding support plate and resting against an outside surface of the deposition module.

In this particular embodiment, the required compression by the deposition module on the deposition head can be generated merely by rotating the compression screw by half a revolution.

BRIEF DESCRIPTION OF THE DRAWINGS

Further advantages of the invention are stated in the subsequent claims and are elucidated in the description of an illustrative embodiment.

DETAILED DESCRIPTION OF THE INVENTION

The drawings show a device 10 for dispensing controlled quantities of flowing media.

Such a device 10 comprises a deposition head 11 and at least one deposition module 12 fitted with a noble head 13.

Figure 1:
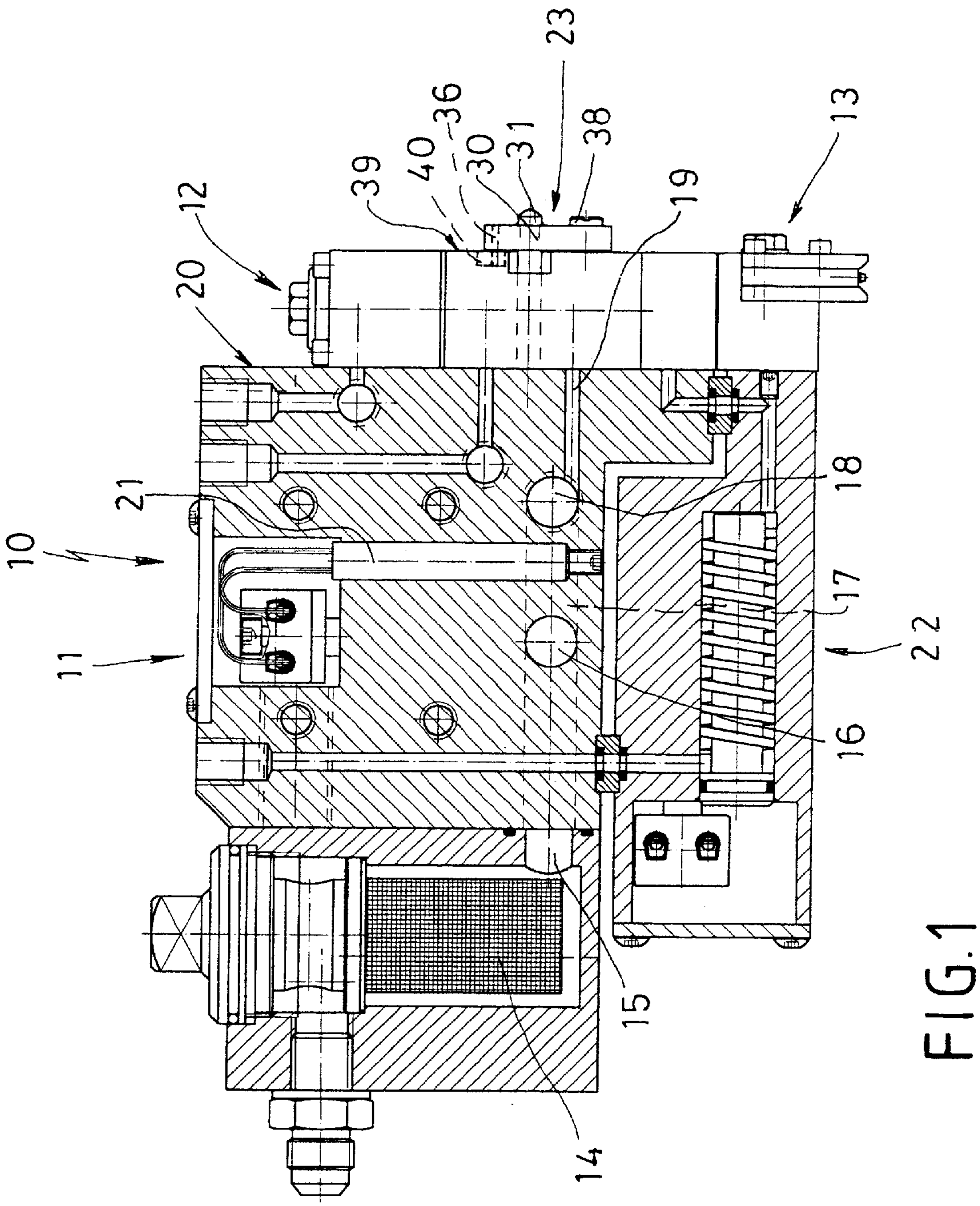
FIG. 1 is a cross-section of a deposition head having a deposition module attached thereto.

FIG. 1 is a detailed view of the device 10. Only those elements relating to the invention will be discussed below. The adhesive to be dispensed in a controlled manner through the deposition module 12 is fed through a filter block 14 and a connecting duct 15 to a pressure distribution duct 16 which is connected through another duct 17 to a main manifold duct 18. Numerous adhesive feed ducts 19 start at the main manifold duct 18 and issue into a boundary surface 20 facing the deposition module 12. Following affixation of the deposition module 12, the mouths of the adhesive feed ducts 19 are aligned with corresponding adhesive feed ducts (not shown) in the deposition module 12.

In order to ensure that the adhesive used in the device 10 has a uniform and adequately high temperature, a heating cartridge 21 is mounted in the vicinity of the above described adhesive feed system. Furthermore, an air heater 22 is configured underneath the adhesive feed system to supply the required hot spraying air.

FIG. 1 also shows an affixation system 23 which shall be elucidated below.

Figure 2:
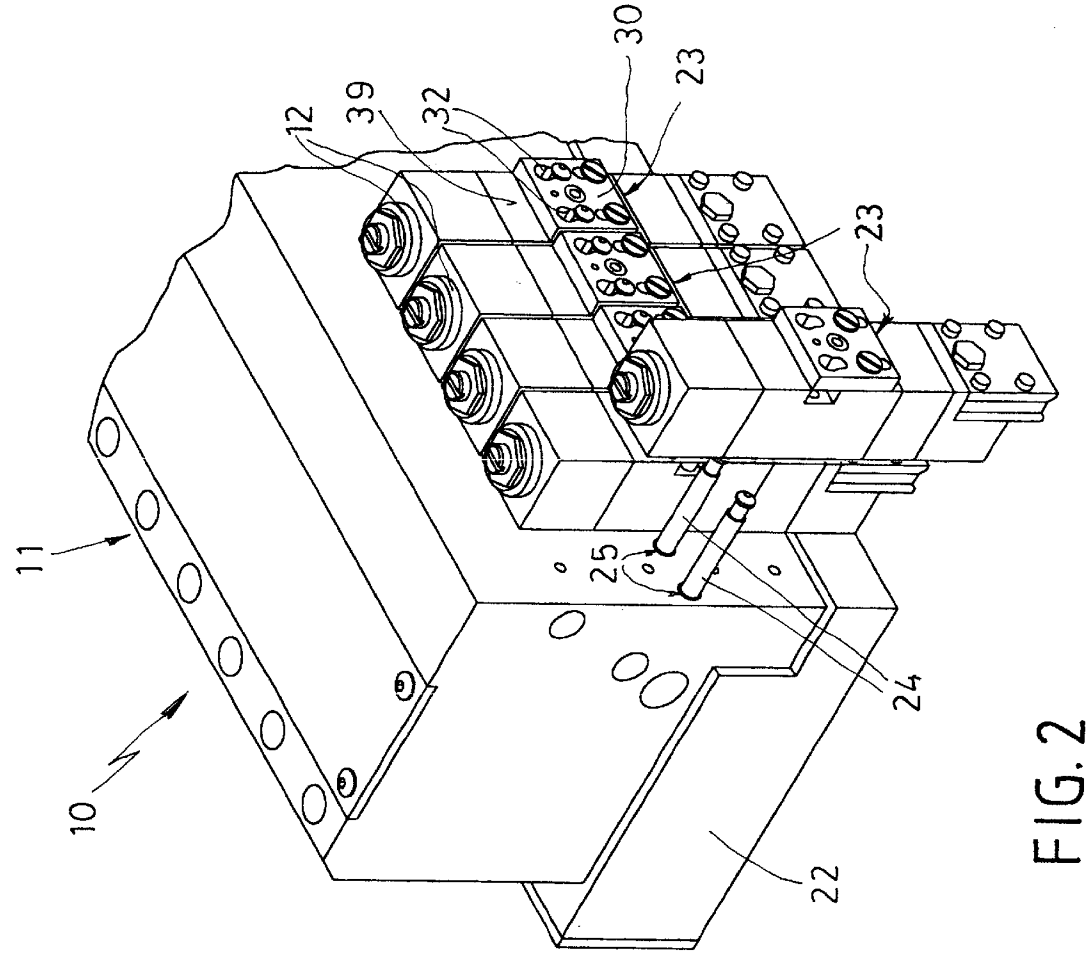
FIG. 2 is a perspective partial view of the deposition head of FIG. 1 fitted with a number of deposition modules.

FIG. 2 is a perspective view of the device 10. Four deposition modules 12 have already been affixed by the affixation system 23 to the deposition head 11. Two mounting pins 24 are shown at the fifth affixation position to be mounted in threaded boreholes 25 of the boundary surface 20. In a pre-assembly configuration, boreholes (not shown) of the deposition module 12 can be slipped onto the mounting pins 24.

Figure 3:
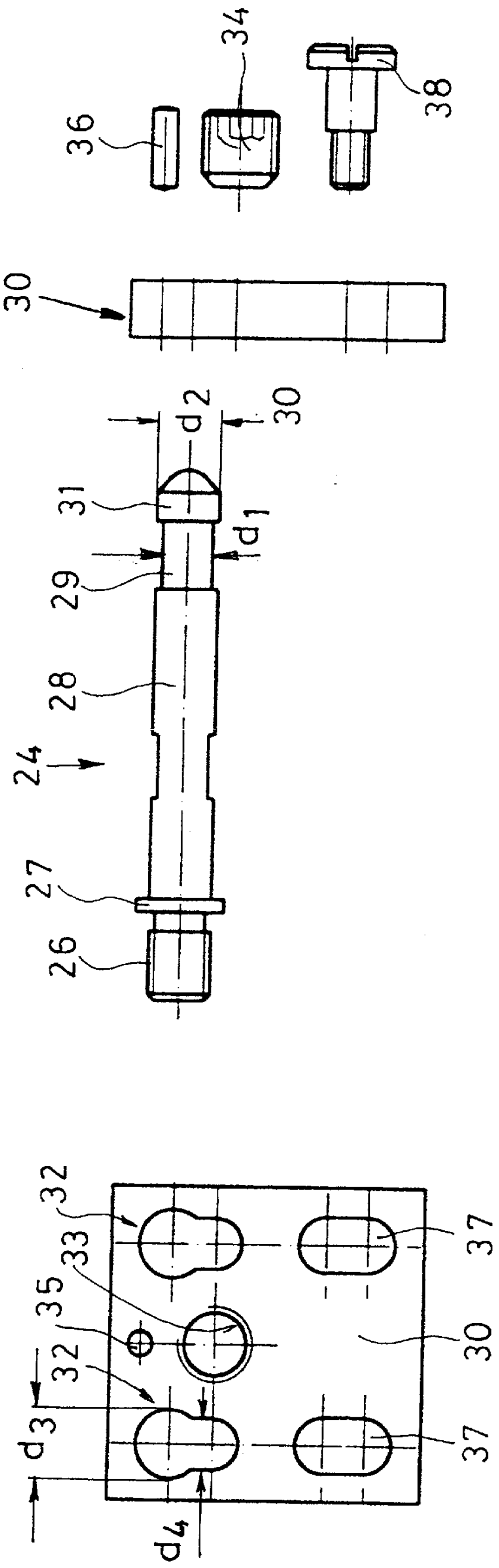
FIG. 3 is an exploded view of a fastener system for the deposition module.

The individual components of the affixation system 23 shown in FIG. 3 shall be comprehensively discussed next to elucidate the affixation of the deposition module 12 to the deposition head 11. The affixation system 23 includes the above mentioned mounting pins 24. Each mounting pin 24 is fitted with a thread 26 and a stop flange 27 at an end thereof which is adapted to attached to the boundary surface 20. Next to the flange 27 are a spacer 28 adapted to pass through and be received in the borehole (not shown) in the deposition module 12. At the other end of each mounting pin 24 are an engagement groove 29 and a tightening head 31. In the region of the engagement groove 29, the diameter of the mounting pin 24 is $d_1$ and in the region of the tightening head 31 it is $d_2$.

The affixation system 23 further comprises a sliding plate 30 provided in its upper portion (FIG. 3) with two elongated slots 32 sized to allow the mounting pins 24 to pass through. A threaded borehole 33 is provided between the elongated holes 32 for receiving a compression screw 34 with a hexagonal socket head. A borehole 35 is arranged above the threaded borehole 33 to receive a guide pin 36.

The upper parts of the elongated slots 32 have a diameter $d_3$ which slightly exceeds diameter $d_2$ of the tightening head 31. Diameter $d_4$ of the lower parts of the elongated slots 32 is less than diameter $d_2$ of the tightening head 31 and somewhat larger than diameter $d_1$ of the engagement groove 29.

Lastly, two elongated slots 37 are situated underneath the slots 32 for receiving panhead screws 38 which, when screwed to an outside surface 39 of the deposition module 12, will provide a predefined displacement gap for the sliding plate 30. The panhead screws 38 assure that the vertically sliding plate 30 shall always be retained on the deposition module 12. The guide pin 36 enters a groove 40 in the outside surface 39 and in this manner additionally guides the sliding plate 30.

If, as shown in FIG. 2, a deposition module 12 needs to be affixed to the deposition head 11, then the deposition module 12, fitted with a sliding plate 30, can be slipped onto the mounting pins 24 until the tighting heads 31 project from the sliding plate 30 in the area having diameter $d_3$ of the elongated slots 32. Once this configuration has been attained, a reliable pre-assembly position shall have been implemented.

Figure 4:
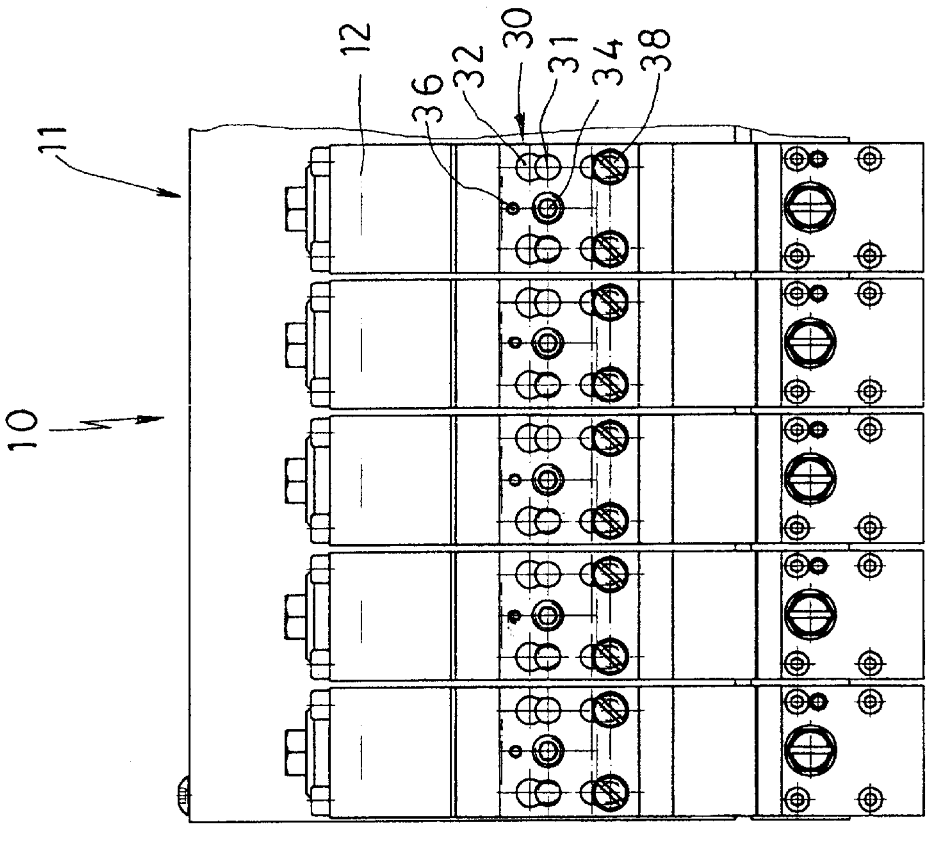
FIG. 4 is a front view of the deposition head and deposition modules affixed thereto.

If now the sliding plate 30 is moved up against the force of gravity, the tightening head 31 as well as the engagement groove 29 arrive in the zone having diameter $d_4$ of the elongated slots 32. As a result, the tightening head 31 operates as a support. This fact is significant because next the compression screw 34 is moved, for instance by half a revolution, in the direction of the outside surface 39 of the deposition module 12 and clamps the sliding plate 30 while simultaneously pressing the depositon module 12 against the boundary surface 20 of the deposition head 11 (FIG 4). As a result, the deposition module 12 is immovably fixed, though it can be released anytime by loosening the compression screw 34.

What is claimed is:

1. A device for dispensing flowing media in a controlled manner, comprising a deposition head having a boundary surface and at least one feed duct opening to the boundary surface for supplying a fluid;

at least one deposition module having at least two through boreholes and a nozzle head adapted to communicate with the at least one feed duct to deposit the fluid when the deposition module is mounted on the boundary surface of the deposition head; at least two mounting pins extending from the boundary surface of the deposition head, passing through the through boreholes in the deposition module and having end zones projecting from the deposition module; and a clamping element arranged in a region of the end zones of the mounting pins for pressing and fastening the deposition module to the boundary surface of the deposition head.

2. Device as claimed in claim 1, characterized in that a support plate (30) enclosing both end zones of the mounting pins (24) is configured between the clamping element (34) and the deposition module (12).

3. Device as claimed in claim 1, characterized in that the end zones of the mounting pins (24) each are fitted with a tightening head (31) of a diameter ($d_2$) larger than a preceding engagement groove (29), in that the engagement groove (29) cooperating with the support plate (30) is of a diameter ($d_1$) less than the mounting pin (24) and in that the support plate (30) is a sliding plate fitted with elongated slots (32) which run in the direction of gravity to receive the end zones of said mounting pins and which, as seen in the direction opposite gravity, comprise a first zone of diameter ($d_3$), which comprises a diameter ($d_4$) less than the diameter ($d_2$) of the tightening head (31), whereas, in the direction of gravity and in a second zone, the diameter of the elongated slots (32) only slightly exceeds the diameter ($d_1$) of the mounting pins (24) in the area of the engagement groove (29).

4. Device as claimed in claim 1, characterized in that the clamping element (34) is a compression screw (34) mounted in a threaded borehole (33) of a support-plate/sliding-plate (30) and resting against an outside surface (39) of the deposition module (12).

5. Device as claimed in claim 1, characterized in that the clamping element (34) rests against a support-plate/sliding-plate (30).

6. Device as claimed in claim 1, characterized in that the clamping element (34) is an eccentric lever.

7. Device as claimed in claim 1, characterized in that a sliding plate (30) is fitted with a guide pin (36) pointing toward the deposition module (12) and entering a matching groove (40) in the outside surface (39) of the deposition module (12).

8. A fluid feeding apparatus, comprising:

a deposition head having a boundary surface and at least one feed duct opening to the boundary surface for feeding a fluid;

at least one mounting rod extending from the boundary surface of the deposition head and having first and second ends, the first end being fixed to the boundary surface, the second end having a head portion;

a deposition module including at least one through bore slipped over the at least one mounting rod so that the second end thereof projects from a front surface of the deposition module, the deposition module further including a nozzle in communication with the at least one feed duct for depositing the fluid; and a clamping element of an adjustable thickness fitted on the second end of the mounting rod for filling a gap between the head portion of the mounting rod and the front surface of the deposition module, thereby fastening the deposition module to the deposition head.

9. The apparatus of claim 8, wherein the clamping element comprises a support plate including at least one slot corresponding to the at least one mounting rod, the at least one slot being sized to allow the head portion of the mounting rod to pass through, whereby the support plate can be fitted on the mounting rod by slipping the at least one slot over the second end of the mounting rod.

10. The apparatus of claim 9, wherein the at least one slot includes an elongated slot having a first section of a dimension d3 larger then a dimension d2 of the head portion of the mounting rod and a second section of a dimension d4 smaller tha d2.

11. The apparatus of claim 10, wherein the second end of the mounting rod further includes an engagement portion adjacent to the head portion and having a dimension d1 smaller than d4.

12. The apparatus of claim 8, wherein the clamping element comprises a support plate fitted on the second end of the mounting rod, and having opposite surfaces one of which rests against the head portion of the mounting rod, and a clamping member adjustably projecting from the other of the opposite surfaces toward the front surface of the deposition module for pressing and fastening the deposition module to the deposition head.

13. The apparatus of claim 12, wherein the support plate includes a threaded bore communicating the opposite surfaces thereof, and the clamping member includes a clamping screw threadably receivable within the threaded bore.

14. The apparatus of claim 8, wherein the first end of the mounting rod includes a thread completely screwed into a threaded bore formed on the boundary surface of the deposition head.

15. The apparatus of claim 8, wherein the first end of the mounting rod includes a thread screwed into a threaded bore formed on the boundary surface of the deposition head; and a stop flange firmly rests on the boundary surface.

16. A method of attaching/detaching a deposition module having at least one through bore and a nozzle to/from a boundary surface of a deposition head having at least one feed duct opening to the boundary surface for feeding a fluid to the bozzle, said method comprising the steps of:

rigidly fixing an end of at least one mounting rod to the boundary surface;

slipping the at least one through bore of the deposition module over the at least one mounting rod so that an opposite end of the mounting rod which is formed with a head portion projects from a front surface of the deposition module;

fitting a clamping element on the opposite end between the head portion of the mounting rod and the front surface of the deposition module; and fastening the clamping element to press the deposition module against the boundary surface of the deposition head without reducing a distance between the head portion of the mounting rod and the boundary surface of the deposition head.

17. The method of claim 16, wherein the mounting rod is fixed to the boundary surface by thread and said fastening is performed without further screwing the mounting rod into the deposition head.

18. The method of claim 16, wherein the clamping element comprises a support plate including an elongated slot having a first section of a dimension d3 larger than a dimension d2 of the head portion of the mounting rod and a second section of a dimension d4 smaller than d2, the opposite end of the mounting rod further includes an engagement portion adjacent to the head portion and having a dimension d1 smaller than d4, said fitting comprises slipping the first section of the elongated slot over the head portion until the support plate arrives at the engagement portion; and sliding the support plate to position the engagement portion in the second section.

19. The method of claim 18, wherein said sliding is performed in a direction against gravity.

20. The method of claim 16, further comprising detaching the deposition module from the boundary surface without loosening or removing the mounting rod from the deposition head.

* * * * *